Oct. 10 1933.  G. SEIBT ET AL  1,929,904
GLOW TUBE FOR AMPLIFYING, DETECTING, AND OTHER PURPOSES
Filed Sept. 7, 1929  3 Sheets-Sheet 1

G. Seibt &
H. Bley, INVENTORS

By: Marks &c... Attys.

Oct. 10 1933. G. SEIBT ET AL 1,929,904
GLOW TUBE FOR AMPLIFYING, DETECTING, AND OTHER PURPOSES
Filed Sept. 7, 1929   3 Sheets-Sheet 2

G. Seibt &
H. Blex
INVENTORS

By: Marks & Clerk
ATTYS.

G. Seibt & H. Bley INVENTORS

Patented Oct. 10, 1933

1,929,904

UNITED STATES PATENT OFFICE 1,929,904

GLOW TUBE FOR AMPLIFYING, DETECTING, AND OTHER PURPOSES

Georg Seibt and Hellmuth Bley, Berlin-Schoneberg, Germany

Application September 7, 1929, Serial No. 391,050, and in Germany October 29, 1928

9 Claims. (Cl. 250—27.5)

This invention relates to a glow tube for amplifying, detecting, and other purposes, in which a glow discharge takes place between two electrodes, hereinafter referred to as the discharge electrodes, and in which an additional amplifying anode is provided which produces the amplification current between it and the discharge anode, the said amplification current being controlled by a controlling electrode. It is known in connection with such arrangements to dimension the constituent parts of the tube in such a manner that the Faraday dark space extends up to the grid-like discharge anode, with the result that only negative discharge particles pass through the said grid and travel towards the discharge anode.

However, it has not hitherto been possible to obtain practical results with such tubes. The reason therefor has probably been that the electrons which are produced between the two discharge electrodes $k$ and $a_1$ (see Fig. 1 of the accompanying drawings) fly through the openings in the discharge anode with a definite speed and are attracted by the amplifying anode. However desirable it may be to make the amplification current flowing towards $a_2$ as large as possible, it must not be overlooked that this current must be greatly dependent upon the voltage applied to the amplification anode and, in the case of a controlling grid, upon the controlling voltage of the latter. However, when the electrons passing through the discharge electrode $a_1$ have a certain speed owing to the field existing between the cathode $k$ and the anode $a_1$ this electronic current is naturally very little dependent upon the voltage outside the field of discharge. Consequently the slope of the anode voltage current characteristic is very small and no useful amplification is obtained.

The main idea of the present invention is directed to dimensioning and choosing the voltage applied to the electrodes, the shape and size of the electrodes and also the nature of the gas and the gas pressure, so that the ordinary luminous glow discharge takes place only between the cathode $k$ (see Fig. 1) and the discharge anode $a_1$, while the electric field between the glow discharge electrodes and the amplifying anode $a_2$ is not simply a continuation of the discharge field $k$, $a_1$, as in the known arrangement, but consists of an electron discharge which is as pure as possible and the discharge particles of which come only indirectly from the glow discharge. In other words, it is necessary to ensure as much as possible that the electrons constituting the amplification current shall no longer have a speed dependent upon the field of the glow discharge at the points where the electrons coming from the discharge field reach the amplification field. The potential of the amplifying anode must be so low with respect to the discharge anode and the gas pressure must be such that the amplification field cannot form any glow discharge and that its discharge takes place as if an incandescent cathode were present instead of the glow discharge.

The following experiment showed the way to be followed in order to carry the invention into effect. A cathode $k$, a discharge anode $a_1$ and a second anode $a_2$ were arranged in a tube filled with neon of 6 mm. pressure according to the arrangement illustrated in Fig. 2. The electrodes $k$ and $a_1$ consisted of strips 5 mms. wide shaped in the form of a U and the electrode $a_2$ of a wire bent in the shape of a U. The distance between the electrodes was 5 mms. When a voltage of 200 volts, the current being approximately 16 milliamps, was applied between the electrodes $k$, $a_1$, the surprising effect was obtained that even with a very small excess voltage of $a_2$ with respect to $a_1$, a substantial electronic current was produced between $a_1$ and $a_2$, which showed even with a voltage difference of about 1 volt a saturation at about 10 milliamps. The current voltage characteristic was very steep up to this saturation voltage, as can be seen from Fig. 3. Thus the space charge was very small.

Not only the voltage and the gas pressure but also the shape of the electrodes must be properly chosen. Also in this case care must be taken to avoid that the electrons which are produced in the glow discharge field and which are caused by the latter to have a high speed must fly without any obstruction towards the amplifying anode. If this precaution is not taken a strong current would, it is true, be caused to flow towards the amplifying anode $a_2$ but this depends upon whether the voltage of $a_2$ would be small, since acceleration of the electrons forming this current would be due mainly to the voltage between $k$ and $a_1$ and less to the voltage of $a_2$.

According to the present invention the discharge anode is so constructed that it screens the discharge paths of the glow with respect to the amplifying zone as much as possible. We, therefore, propose to construct the discharge anode in the form of a plate. Such a plate constitutes an obstacle for the electrons which fly in a substantially straight line from the cathode. However, it allows to reach the second anode substantially without any obstacle those electrons which have been produced in the discharge zone but have reached, for instance owing to reflection on the gas molecules, into the space outside the glow zone proper and which, owing to the small acceleration which they still possess from the discharge field, mainly constitute the amplification current.

This assumption has been confirmed by the following experiment, which has been carried out by the applicants:

First of all the discharge anode was made in the form of a thin wire, while the cathode and the amplifying anode were plate-shaped. With such a construction, a large portion of the electrons produced in the discharge field flies without any obstruction towards the amplifying anode. Measurements proved that in consequence thereof an electronic current was produced which was large but only to a small extent dependent upon the voltage of the amplifying anode. In the second experimental arrangement, the two discharge electrodes were constructed in the form of plates, whilst the amplifying anode was constituted by a wire. The amplification current obtained with this arrangement showed a considerably steep characteristic, which is a sign that the acceleration of the electrons of this amplified current was produced mainly by the voltage of the anode $a_2$.

The fundamental idea of the invention was thus carried one step forward by increasing the edges of the plate-like discharge electrodes. Further, either the discharge cathode or the amplifying anode, or both, was or were made of the same shape and size as the discharge anode, whereby it was in any case prevented that electrons moving in a straight line from the cathode should reach the amplifying anode through an opening in the discharge anode. Such arrangements are illustrated in Figs. 4 and 5.

In the arrangement illustrated in Fig. 4, the two discharge electrodes $k$ and $a_1$ are in the shape of a double T while the amplifying anode $a_2$ is constructed in the form of a plate.

According to Fig. 5, the discharge anode and the amplifying anode are constructed in the form of a double T while the discharge cathode is constructed in the form of a plate. The arrows indicated in the drawings illustrate diagrammatically the path of a straight electronic discharge and they show that in this case the discharge anode $a_1$ produces such a "shadow effect" that the amplifying anode $a_2$ is never impinged upon directly.

The carrying out of this idea in practice is partly effected by this side that owing to the gas molecules which are present, the electrons do not traverse straight paths between the point of discharge and the amplifying anode. For this reason the increase in the peripheral line of the discharge anode, that is to say the provision of recesses, holes and the like, must not be carried too far, as otherwise the "shadow effect" of the discharge anode would become worse. This is presumably also the reason why the discharge anode must not be made in the form of a grid as previously. It is true that a grid has a very favourable edge effect, that is to say a large number of electrons reach from the discharge field into the amplification field. These electrons, however, owing to the small screening effect of the grid, contain a large number of electrons which have been accelerated by the discharge field itself, so that no controlling effect of the electrodes provided in the amplification field takes place. Therefore, according to the invention an optimum has to be ascertained as regards the relative proportions of the two effects of the discharge anode, screening effect and edge effect, which optimum depends each time on the properties which the tube has to possess. Thus, for instance, if it is desired that the slope should be great but the amplification current small, the discharge anode is made more of a plate-like shape, that is to say it has not many recesses or holes; on the other hand, when the slope is small and the amplification current large, the subdivision of the effects above referred to and consequently the large effect of the discharge anode is correspondingly increased. In all cases it is an advantage to make the cathode of the same shape and the size as the discharge anode (see Fig. 4) and to place these two electrodes as close as possible relatively to one another, for instance at a distance of 3-5 mms. or less, since such an arrangement improves the screening effect of the discharge anode without the edge effect being affected. The amplifying electrodes may then have a higher surface than the discharge electrodes.

The following points have to be borne in mind with respect to the present invention. The electronic current which is produced in the known arrangements and which proceeds directly from the discharge impinges in its path upon the controlling electrode which is arranged between the discharge and the amplifying anode. As a result thereof an exceedingly large positive grid current is produced which destroys the amplification effect. For this reason it was necessary to employ a very high negative grid bias, which had the further result that a very flat portion of the characteristic was reached.

According to a further feature of the invention, also the controlling electrode is so arranged and constructed that the accelerated electrons, more especially those which proceed directly from the discharge field, are prevented as much as possible from impinging upon the controlling electrode. The controlling electrode is therefore so arranged that it is screened against the discharge space by the discharge anode. Such an arrangement is diagrammatically illustrated in Figure 6. The individual wires of the controlling grid $s$ are so arranged that the straight line connection between them and the discharge cathode is interrupted by the solid portions of the discharge anode $a_1$. Further, it is an advantage to arrange the controlling electrode as close as possible to the discharge anode, so that its shadow effect shall not be affected. The controlling effect of the grid upon the electrons which are accelerated by the amplifying field itself must not, however, be in any way affected by this arrangement. Therefore it may be an advantage to make the controlling electrode not of wires but of strips, the surface of which is at right angles to the surface of the discharge anode (see Fig. 7). In addition thereto, it is advisable to make the surface of the controlling electrode slightly larger than that of the discharge anode, so that the accumulation of electrons which occurs outside the actual discharge zone and which leads to the formation of the amplification current shall be capable of being controlled as effectively as possible.

The above points may be summarized as follows:—It is necessary to ensure that a glow discharge shall not take place in the amplifying field and that the electrons constituting the amplifying current shall not be accelerated mainly by the glow discharge field. On the contrary, the amplification current must be an electronic current which is independent of the glow discharge and the discharge particles of which proceed from the glow discharge only indirectly. This result is attained first of all by a suitable choice of the discharge and amplification voltage more particularly by this that the amplifying anode has a positive voltage bias of only a few volts with respect to the discharge anode. The nature of the gas and its pressure must be so chosen that it is impossible to produce a glow discharge in the amplification zone. Further, the amplifying electrodes, that is to say the amplifying anode and the controlling electrode, must be so arranged and so shaped that they are influenced as little as possible by the electrons which are accelerated directly by the discharge field. For this reason the discharge anode is so constructed that it screens the discharge zone with respect to the amplification zone.

On the other hand, however, the electrons which are in the proximity of the discharge field and which are produced by the latter but are no longer or no longer substantially accelerated by it must be influenced as effectively as possible by the two amplifying electrodes. For this reason steps must be taken to ensure that the column which constitutes the discharge zone shall have a peripheral surface which will be as large as possible; this may be secured by the provision of holes or recesses in the discharge electrodes, at least in the discharge anode. If it is desired to obtain a tube with a small mutual A. C. conductance, it is advisable to provide parts of the controlling electrode also opposite the gaps or recesses provided in the discharge anode. A portion of the screening effect of the discharge anode may thereby be lost, so that the grid current is slightly increased. For this reason a suitable optimum between the two effects must also be ascertained in this case, if necessary by experiments, which optimum is dependent upon the shape and dimensions of the electrodes and in addition thereto upon the nature and pressure of the gas filling; the optimum is further dependent upon the particular application of the tube, for instance as to whether a large or a small mutual A. C. conductance is required.

The above experiments and conclusions lead to an arrangement of electrodes such as is for instance illustrated in Figs. 8 and 9, which should give especially good results. The arrangement of the electrodes is concentric, the discharge electrodes $k$ and $a_1$ being arranged towards the outside and the amplifying electrodes $s$ and $a_2$ towards the inner side of the tube. The discharge cathode is not constructed in the form of a complete cylinder but is provided with openings or strip-like slots. The discharge anode $a_1$ corresponds to the shape of the cathode $k$ but is of smaller dimensions and is so arranged that, looking in a radial direction, a gap in the anode $a_1$ lies opposite a gap in the cathode $k$. The controlling electrode $s$ may, if special importance is attributed to a small grid current with a large mutual A. C. conductance, be constructed in the form of a network of wires or bands, as shown in Fig. 8, the surface of which runs radially and in which the individual wires or bands lie exactly between the amplifying anode $a_2$ and the discharge anode $a_1$. If it is desired to obtain a smaller mutual A. C. conductance, the grid may be made more close, so that in that case parts of the network lie also opposite the gaps of the discharge anode $a_1$. In the case of smaller mutual A. C. conductances, it is still more advantageous to use an arrangement as shown in Fig. 9, in which the controlling electrode is constructed as a helix surrounding the amplifying anode.

In order to obtain a further reduction in the grid current to a very small and no longer detrimental value the following means may be used according to the invention.

The two discharge electrodes are not constructed so that they shall have the same shape and corresponding positions but so that the edges of the discharge anode shall project beyond the straight line connection between the edges of the discharge cathode and the amplifying electrodes. In this way it is attained that a direct discharge from the discharge cathode to the amplifying anode and to the controlling electrode shall no longer take place at the edge portions. The amplifying current is then constituted only by such discharge particles which are no longer accelerated directly by the discharge field itself and are produced in the proximity of the discharge field and arrive there from the discharge field and are then attracted by the amplifying anode.

This is illustrated in Figs. 10–16. Fig. 10 shows that in the one arrangement, in which the solid parts and the openings of the two discharge electrodes $k$ and $a_1$ are arranged exactly opposite one another, comparatively large portions of the amplifying anode $a_2$ and of the controlling grid $s$ are still impinged upon by discharge particles proceeding in a straight line from the cathode. The portions which are swept by such discharge particles have been shown in hatched lines and the boundaries thereof indicated by dotted lines.

Figs. 11–16 illustrate, mostly diagrammatically and in section, further examples according to the present invention.

Figure 11 shows an arrangement having flat electrodes arranged to follow one another as follows:—cathode $k$, discharge anode $a_1$, controlling electrode $s$, amplifying anode $a_2$. The openings or slots in the two discharge electrodes $k$ and $a_1$ are not of the same size, the openings in the discharge anode being smaller than those in the cathode. As a result thereof, the surfaces which are swept by the discharge particles proceeding directly from the cathode are much smaller than in the case of the construction illustrated in Fig. 10.

If the amplifying anode $a_2$ is also provided with slots or openings, they may be so arranged that at no point is the anode $a_2$ impinged upon by the discharge particles coming directly from the discharge zone. Similarly the grid- or helically-shaped controlling electrode $s$ may be so constructed that it is nowhere impinged upon by the direct discharge particles of the glow discharge field. The arrangement illustrated in Figure 11 may be further modified by this that the controlling electrode is not arranged as a flat grid between the anodes $a_1$ and $a_2$ but helically surrounds the amplifying anode $a_2$.

Figure 8:
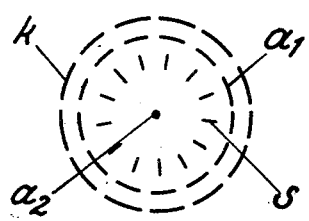
Figure 9:
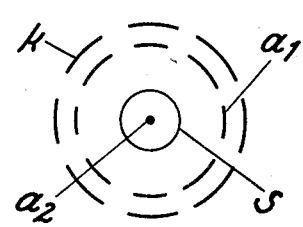
Figure 10:
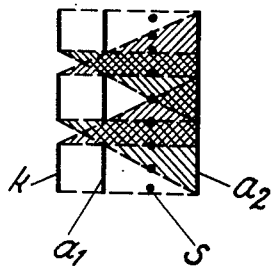
Figure 11:
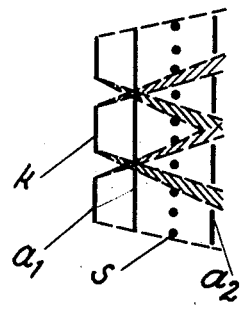
Figure 12:
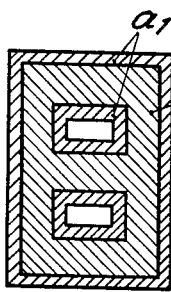
Figure 12 illustrates the two discharge electrodes $k$ and $a_1$ in plan view seen from the direction of $k$. It will be seen from this figure that the solid parts of the discharge anode $a_1$ project not only at the outer edges but also at the openings and recesses beyond the solid parts of the cathode $k$.
Figures 13, 14:
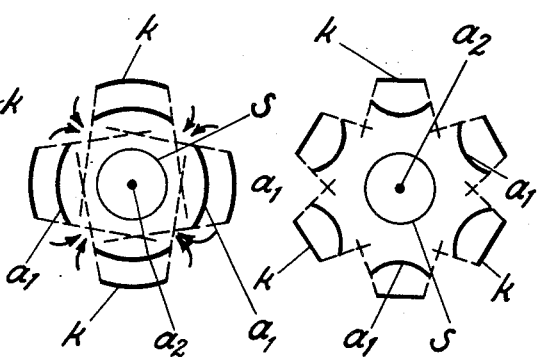
Figures 13–16 illustrate concentric arrangements of electrodes.

According to Figure 13, the cathode is constituted by the outermost cylinder, which is followed by the discharge anode $a_1$, the controlling electrode $s$ and finally the amplifying anode $a_2$, which is for instance shown simply as a rod or wire. The solid parts of the discharge anode $a_1$ are in this case not, as is for instance shown in Figure 8 or 9, smaller than the corresponding solid parts of the cathodes but they are either just as large or larger than the solid parts of the cathode. In this way it is attained that the two amplifying electrodes $s$ and $a_2$ lie completely "in the shadow" of the discharge particles which proceed in a straight line from the cathode, as is clearly indicated by the dotted lines. The amplifying anode $a_2$ attracts only the discharge particles which proceed from the glow discharge field or from its proximity and follow along the curved arrows.

Figure 14 illustrates a modification of the arrangement shown in Figure 13, by means of which a still greater screening effect of the glow discharge field is produced by the discharge anode $a_1$ with respect to the amplifying field. In this arrangement the individual surfaces of the discharge anode $a_1$ are bent at their edges towards the cathode $k$. This arrangement has the advantage that the discharge anode can be brought very close to the controlling electrode without the shadow effect being thereby affected.

Figure 1:
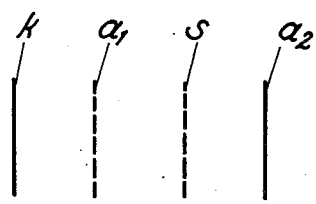
Figure 2:
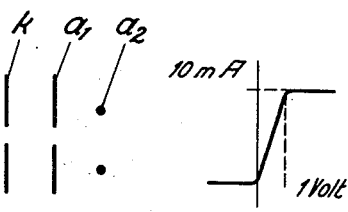
Figure 3:
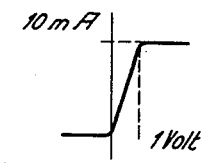
Figure 4:
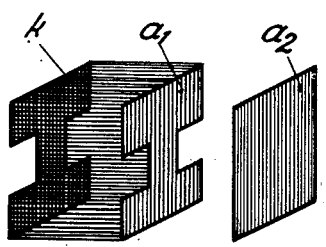
Figure 5:
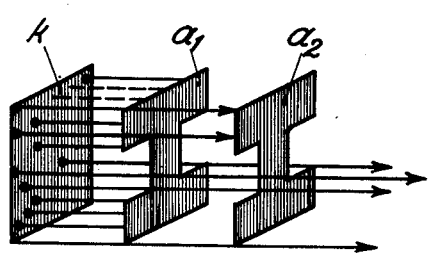
Figure 6:
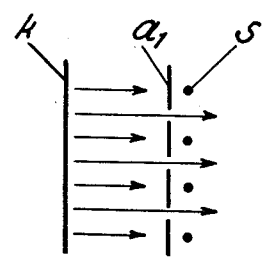
Figure 7:
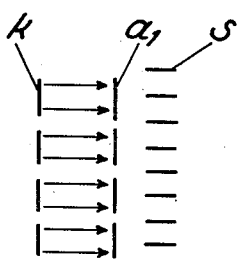
Figure 15:
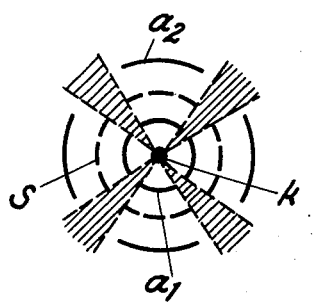
Figure 16:
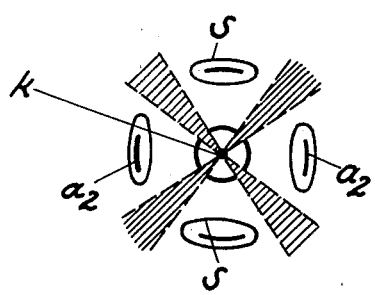

Figures 15 and 16 illustrate concentric arrangements in which the succession of the various electrodes takes place in the opposite direction. The cathode $k$ is arranged in the centre, being constituted by a wire or rod. The cathode is surrounded by two concentric cylinders, viz the discharge anode $a_1$ and the amplifying anode $a_2$, whilst between the two latter electrodes the controlling electrode $s$ is arranged. In Figure 6 the controlling electrode $s$ is also constructed in the form of a cylindrical grid. Also in this arrangement the shadow lines indicated by dash lines show that all straight line connections between the cathode $k$ and one of the amplifying electrodes are interrupted by the screening action of the discharge anode $a_1$. The arrangement illustrated in Figure 16 differs from that shown in Figure 15 essentially by this that the controlling electrode $s$ is not constructed as a cylindrical grid but consists of a plurality of helices, which surround the individual surfaces of the amplifying anode $a_2$.

It is to be understood that the invention may be carried into effect by other arrangements than those hereinbefore described. The essential feature of the invention consists in this that the straight line connections between the cathode and the amplifying electrodes are all, or to a large extent, interrupted by the discharge anode, the surfaces of the discharge anode projecting beyond the straight line edge connections between the cathode and the amplifying electrodes.

In order to obtain a good controlling effect by the controlling electrode, it is advisable to provide a good insulation between the leads to the individual electrodes within the tube, as otherwise glow discharge currents may pass more particularly between the cathode and the amplifying anode, which currents are not controlled by the grid.

When considering the screening effect of the discharge anode, it must not, however, be overlooked that the amplifying current should be made as large as possible, that is to say the electronic current which starts from the surrounding of the glow discharge zone and flows towards the amplifying anode and which is mainly accelerated only by the voltage of the amplifying anode. The greater this current, the wider is the portion of the characteristic of the tube which can be utilized and consequently also the output to be transmitted. Now, as this amplifying current, as already pointed out above, should consist as far as possible only of electrons which are produced in the neighbourhood of the glow discharge field and which have a very small velocity at their source of production, care must be taken that such sources of the amplification current should be as numerous as possible.

Figure 17:
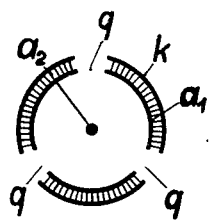

If we consider, for instance, an arrangement of the discharge electrodes as shown in Figure 17 of the accompanying drawings, it will be seen that the largest portion of the glow discharge current which passes between the two discharge surfaces $k$ and $a_1$ does not contribute to the formation of an anode current to the second anode $a_2$ and consequently constitutes a dead load. The formation of the desired anode current which mainly consists only of electrons drawn from $a_2$ is possible only at the comparatively small number of sources $q$.

It must, therefore, be ensured that whilst the full screening effect of the discharge anode is maintained between the discharge and the amplifying field, it provides a very large number of sources for the amplifying current. In order to attain this result, the cathode is no longer constituted by a plate-like structure as hitherto, but by a network, grid, or sieve. The solid parts of the net- or grid-like construction of the cathode thus cover a smaller surface than their openings. For instance, the cathode may be constructed as a wire net having a mesh of a few millimetres. The discharge anode associated therewith has substantially the same net, grid or sieve formation as the cathode, the only difference being that its openings, which correspond in position and number with the openings in the cathode, are smaller than the latter openings, so that when the discharge electrodes are observed from the front, the edges of the solid parts of the discharge anode project everywhere beyond the edges of the solid parts of the cathode.

Figures 18–22 of the accompanying drawings illustrate, partly diagrammatically, partly in plan view and partly in cross-section various examples of such an arrangement of electrodes.

Figure 18:
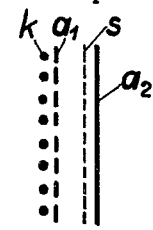
Figure 19:
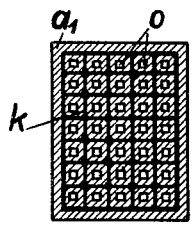

According to the arrangement illustrated in transverse cross-section in Figure 18, the electrodes are flat. The cathode $k$ consists of a plurality of wires or of a wire network. The discharge anode $a_1$ which is arranged at a distance of approximately 5 mms. from the cathode consists of a metal sheet in which holes or slots are stamped and which register with the openings in the cathode, being, however, smaller than the latter holes.

The controlling electrode $s$ is constructed in the form of a wide mesh network or in the form of a spiral, whilst the amplifying anode $a_2$ is constructed simply in the form of a plate. The relations between $k$ and $a_1$ can be clearly seen from Figure 19, which shows a plan view of these two electrodes seen from the side of the cathode. The cathode consists of a rectangular network and the rectangular openings of the discharge anode which register with the openings of the cathode have sides which are about half the length of the sides of the individual meshes of the network of the cathode. The outer edges of the discharge anode also slightly project beyond the outer edges of the cathode. If in such an arrangement the two electrodes are carefully adjusted relatively to one another, that is to say if the centres of the openings in the cathode and in the discharge anode lie exactly opposite one another, the screening effect of the discharge anode is then sufficiently large to prevent detrimental grid currents and anode currents which cannot be controlled, whilst the numerous edges of the two electrodes ensure that there are sufficient sources for the amplifying current. It is to be understood that instead of the cathode being constituted by wires which cross one another, it may be constituted by a series of wires arranged parallel to one another.

In order to maintain the screening effect, it is advisable to arrange also the other electrodes, that is to say the controlling electrode and the amplifying anode, at very small distances from the discharge electrodes. A distance of a few millimetres, for instance 3–5 mms. between the individual electrodes should be the best distance.

Figure 20:
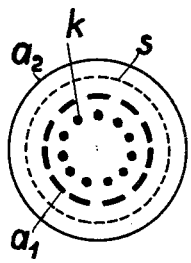
Figure 21A:
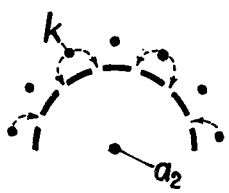
Figure 21B:

Figure 20 illustrates in cross section a concentric arrangement of the electrodes according to the present invention. This arrangement embodies a further improvement as compared with the concentric arrangement hitherto proposed by us, namely the central electrode is not constituted by a simple wire or rod but, like the other three electrodes, it is constructed in the form of a cylinder. It may be an advantage that this central electrode should constitute the cathode for the following reasons: The amplifying current which is accelerated by the amplifying anode $a_2$ should, as stated above, not consist of such electrons which fly from the cathode in the direction of the flow discharge field, that is to say at right angles towards the discharge anode, but of such electrons which fly at a certain angle to the discharge field from the latter or from the cathode. As regards a portion of these electrons, there may, however, be a danger that on their way towards the amplifying anode they are attracted by the parts of the discharge anode of the adjacent glow discharge field and therefore they are not utilized for the amplification. This case is illustrated in Figure 21a, which shows an arrangement of electrodes in which the cathode $k$ surrounds the discharge anode $a_1$. The electrons which fly at an angle to the glow discharge field in the direction of the dotted arrows, all of which electrons should actually move towards the amplifying anode $a_2$, pass very close to the portions of the discharge anode adjacent to the field of their production and may be partly attracted by them. It will be seen that if the concentric arrangement is reversed, as is illustrated in Figure 21b, the electrons produced for the amplification current have more space between the individual parts of the discharge anode to fly through, so that in this case the danger that a portion of these electrons will get lost as regards the amplification current by moving past the discharge anode is avoided.

Figure 22:
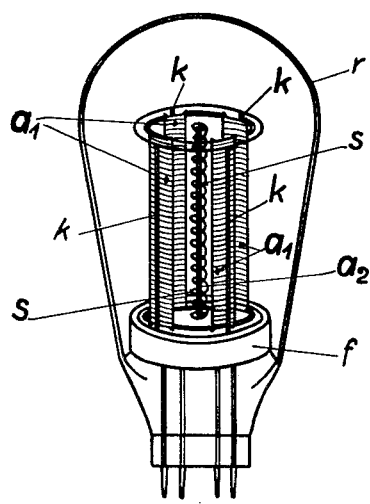

Figure 22 illustrates, by way of example, a construction of a glow discharge tube embodying all the features claimed in the appended claims. The system of electrodes of this tube comprises a centrally arranged rod $a_2$, which constitutes the amplifying anode, the said rod being surrounded by a cylindrical helix $s$, which constitutes the controlling electrode. The latter is concentrically surrounded by the discharge anode $a_1$, which consists of four strips disposed along the periphery of a cylinder. Beyond the solid parts of the discharge anode $a_1$, there is concentrically arranged the cathode $k$ which consists of parallel wires, each of which is arranged behind a portion of the discharge anode $a_1$ in such a manner that discharge particles which issue at right angles from the cathode cannot impinge upon the two amplifying electrodes $s$ and $a_2$, since they are screened by the solid parts of the discharge anode $a_1$. The solid parts of the discharge anode are slightly bent at their longitudinal edges towards the wires of the cathode. The whole system of electrodes is mounted on a base $f$, which consists of an insulating body, preferably of cylindrical shape, its upper surface being provided with concentric grooves carrying the individual concentric electrodes. The leads to the individual electrodes pass through the said cylindrical base $f$. The whole system of electrodes is enclosed in a glass tube $r$, which is preferably filled with a rare gas.

The tube is preferably filled with a rare gas, for instance neon, which is used at a pressure of a few millimetres. It is to be understood that the glow tube forming the subject matter of the present application is not limited to its use for amplification but may also be employed for rectification purposes and for the generation of alternating currents.

What we claim is:—

1. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said cathode and said first anode each being constituted by a plurality of parts of equal number facing exactly one another, the parts forming said first anode being formed and arranged as shields between the corresponding parts of said cathode and said controlling electrode.

2. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said first anode being formed and arranged as a shield between said cathode and said controlling electrode, said first anode and said controlling electrode being formed as concentric cylinders, said cathode being formed as a further concentric cylinder enclosing said cylindrical first anode and said controlling electrode, and said second anode being formed as a rod in the axis of the other cylindrical electrodes.

3. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said first anode being formed and arranged as a shield between said cathode and said controlling electrode, said cathode, said first anode and said controlling electrode being formed as concentric cylinders, the cathode forming the outer cylinder, said cathode and said first anode having apertures facing exactly one another, the edges of said apertures being parallel to the axis of said cylindrical electrodes and said second anode being formed as a rod in the axis of the other cylindrical electrodes.

4. A glow discharge tube containing a cathode and a first anode for producing a glow discharge, a second anode arranged behind said first anode outside the space of said glow discharge and adapted to receive a gerater positive potential than said first anode, and a controlling electrode between said first and said second anode for modulating the current consisting of electrons of the said glow discharge and passing from said glow discharge space to said second anode, said cathode and said first anode having apertures facing exactly one another, the apertures of the cathode being greater than those of the first anode and said first anode being arranged as a shield between said cathode and said controlling electrode.

5. A glow discharge tube containing a cathode and a first anode for producing a glow discharge, a second anode arranged behind said first anode outside the space of said glow discharge and adapted to receive a gerater positive potential than said first anode, and a controlling electrode between said first and said second anode for modulating the current consisting of electrons of the said glow discharge and passing from said glow discharge space to said second anode, said cathode and said first anode having apertures facing exactly one another and said cathode being made of wires.

6. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said cathode and said first anode each being constituted by a plurality of parts of equal number, facing exactly one another, the parts forming said first anode having a greater extent than those of said cathode, and the parts of said cathode being made of wires.

7. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said cathode and said first anode each being constituted by a plurality of parts of equal number, facing exactly one another, the parts forming said first anode being formed and arranged as shields between the corresponding parts of said cathode and said controlling electrode, and the edges of said parts of the anode being inclined to said cathode parts.

8. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said cathode and said first anode each being constituted by a plurality of parts of equal number facing exactly one another, the parts forming said first anode having a greater extent than those of said cathode, the parts of said cathode forming parts of a cylinder, concentrically surrounding said parts of said first anode, said parts of said first anode forming parts of a cylinder surrounding said controlling electrode forming a concentric cylindrical spiral, said controlling electrode surrounding said second anode forming a rod in the axis of the concentric cylinders, and the edges of said parts of said cathode and said first anode being parallel to the axis of said concentric cylinders.

9. A glow discharge tube containing a cathode and a first anode for producing a glow discharge, a second anode arranged behind said first anode outside the space of said glow discharge and adapted to receive a greater positive potential than said first anode, and a controlling electrode between said first and said second anode for modulating the current consisting of electrons of the said glow discharge and passing from said glow discharge space to said second anode, said cathode and said first anode each being constituted by a plurality of parts of equal number facing exactly one another, the parts of said first anode forming parts of a cylinder surrounding said controlling electrode, said controlling electrode forming a concentric cylindrical spiral, and surrounding said second anode forming a rod in the axis of said concentric cylindrical electrodes, the edges of the parts of said first anode being parallel to the axis of said cylindrical electrodes, said cathode being made of wires forming parts of a cylinder surrounding said other electrodes, said wires being parallel to the axis of said cylindrical electrodes, and said parts of said first anode being arranged as shields between the corresponding parts of said cathode and said controlling electrode.

GEORG SEIBT.
HELLMUTH BLEY.